US005731687A

United States Patent [19]

Hirano et al.

[11] Patent Number: 5,731,687

[45] Date of Patent: Mar. 24, 1998

[54] GENERATOR ASSEMBLY

[75] Inventors: Tutomu Hirano; Shigeru Fujii; Masashi Nakamura, all of Wako, Japan

[73] Assignee: Honda Giken Kogyo Kabushiki Kaisha, Tokyo, Japan

[21] Appl. No.: 634,277

[22] Filed: Apr. 18, 1996

[30] Foreign Application Priority Data

Apr. 20, 1995 [JP] Japan .................................... 7-094836

[51] Int. Cl.[6] .................................................... H02K 5/04

[52] U.S. Cl. ................................ 322/1; 322/40; 290/1 R; 180/68.1; 181/204; 123/198 E

[58] Field of Search ................................ 322/1; 290/1 A, 290/1 B; 60/618; 181/202, 204, 217, 218; 123/198 E, 2

[56] References Cited

U.S. PATENT DOCUMENTS

| | | | |
|---|---|---|---|
| 3,656,044 | 4/1972 | King | 320/2 |
| 3,714,449 | 1/1973 | De Bella | 290/1 |
| 3,805,082 | 4/1974 | Murray | 290/1 |
| 4,098,077 | 7/1978 | Edmaier et al. | 60/272 |
| 4,556,247 | 12/1985 | Mahaffey | 296/24 R |
| 4,629,031 | 12/1986 | Kato et al. | 181/204 |
| 4,698,975 | 10/1987 | Tsukamoto et al. | 60/721 |
| 4,702,201 | 10/1987 | Odo et al. | 123/2 |
| 5,575,349 | 11/1996 | Ikeda et al. | 180/68.1 |
| 5,642,702 | 7/1997 | Kouchi et al. | 123/198 E |

FOREIGN PATENT DOCUMENTS

| | | |
|---|---|---|
| 2-5897 | 2/1986 | Japan . |
| 61-25921 | 5/1986 | Japan . |

*Primary Examiner*—Steven L. Stephan
*Assistant Examiner*—Nicholas Ponomarenko
*Attorney, Agent, or Firm*—Merchant, Gould, Smith, Edell, Welter & Schmidt, P.A.

[57] ABSTRACT

In a generator assembly, outside air, taken from a suction hole into a fixed soundproof housing, is sucked into a portable engine generator covered by a soundproof case to operate an engine and cool the interior of the fixed soundproof housing. The exhaust gas of the engine and the cooling air of the soundproof case are exhausted outside through the exhaust air hole of the soundproof case and the external exhaust hole of the fixed soundproof housing without leaking into the fixed soundproof housing. Therefore, the portable engine generator can be operated while it remains housed within the fixed soundproof housing. The exhaust air duct of the portable engine generator and the communicating duct of the fixed soundproof housing are communicated in a state of close contact, at the time that the portable engine generator has been positioned by a positioning member provided in the fixed soundproof housing. The portable engine generator can be put into or out from the fixed soundproof housing and is guided and housed by wheel guide rails provided within the fixed soundproof housing.

4 Claims, 11 Drawing Sheets

GENERATOR ASSEMBLY

BACKGROUND OF THE INVENTION

1. Field of the Invention

The present invention relates to a generator assembly which is used as a power supply for road equipment or outdoor work facilities and is also usable as an emergency power supply equipment.

2. Description of the Related Art

Engine drive generators for outdoor uses are installed, for example, near roads to serve as emergency power supplies for road equipment or outdoor work facilities. Since there is the high possibility that an engine drive generator of this type will always be exposed to wind, rain, dust, sun and so forth, the engine drive generator is required to be constructed so that it can stand these natural environments for a long period of time.

An engine drive generator designed with these conditions in view has been proposed in Japanese Patent Publication No. HEI 2-5897 entitled "SOUNDPROOF ENGINE WORKING MACHINE" by the applicant hereof. This working machine is shown in FIGS. 9, 10, and 11 (corresponding to FIGS. 4, 6, and 7 of the aforementioned publication).

The working machine, as shown in FIGS. 9, 10, and 11, includes an engine 120 at a lower portion of a soundproof case 100 and a generator 121 at an upper portion of the soundproof case 100 for driving the engine 120.

The soundproof case 100 has upper doors 111 and 113 at the front and lower doors 112 and 114 at the back. The soundproof case further has wire net doors 115 and 116 inside the lower doors 112 and 114. At the time of non-operation, the upper and lower doors 111 through 114 are closed and, during operation, only the lower doors 112 and 114 are opened for charging and exhausting the engine 120 and cooling the interior of the soundproof case 100.

The conventional working machine can stand natural environments over a long period of time by closing the upper and lower doors 111 through 114 during non-operation.

However, since the conventional soundproof engine working machine is operated with the lower doors 112 and 114 open for the charging and exhausting of the engine 120 and for cooling the interior of the soundproof case 100, if an automatic starting operation or an operation by remote control is attempted at the time of power stoppage, the doors will have to be opened first. Therefore, labor is required to open the doors and, in a case where the working machine is assembly at a remote place, the loss of the time leading up to the operation of the machine will be increased.

Additionally, when electric power is to be supplied to a place away from the place (home or fixed place) where the soundproof engine working machine is installed, a long electric cable is needed, thus requiring substantial labor to handle the cable and causing the voltage drop in the long electric cable to be increased leading to the limitation of electric power that can be taken out.

SUMMARY OF THE INVENTION

It is therefore an object of the present invention to provide a generator assembly which can be operated without having recourse to any human intervention under a state where the assembly has been installed so that it can stand natural environments over a long period of time, even in the case of an automatic operation.

Another object of the present invention is to provide a generator assembly which is capable of supplying electric power simply from a fixed place to a remote place as needed.

A generator assembly of the present invention comprises a portable engine generator and a fixed soundproof housing. The portable engine generator has an engine drive generator unit housed in a soundproof case with an exhaust air hole. The fixed soundproof housing has a door for housing the portable engine generator so that it can be put into and out from the housing, a suction hole for taking in outside air, and an external exhaust hole for exhausting cooling air exhausted from the exhaust air hole.

The portable engine generator comprises wheels and an exhaust air duct connected to the exhaust air hole. The fixed soundproof housing comprises wheel guide rails for guiding the wheels, a positioning member for positioning the portable engine generator unit in a predetermined position, and a communicating duct connected to the external exhaust hole. At the time the portable engine generator has been positioned by the positioning member, the exhaust air duct of the portable engine generator is communicated with the communicating duct of the fixed soundproof housing in a state of close contact.

In a preferred form of the present invention, a suction duct extends laterally at an inner part of the fixed soundproof housing remote from the door, and suction holes are provided in opposite ends of the suction duct. The positioning member is formed on a side portion of the suction duct.

Outside air, taken from a suction hole into a fixed soundproof housing, is sucked into a portable engine generator covered by a soundproof case to operate an engine and cool the interior of the fixed soundproof housing. The exhaust gas of the engine and the cooling air of the soundproof case are exhausted outside through the exhaust air hole of the soundproof case and the external exhaust hole of the fixed soundproof housing without leaking into the fixed soundproof housing. For this reason, no labor is required to open the fixed soundproof housing, and the engine drive generator could be operated even if it was housed within the fixed soundproof housing for a long period of time.

To supply electric power from the fixed soundproof housing to a remote place, the door of the fixed soundproof housing is opened to take out the portable engine generator from the fixed soundproof housing, and the portable engine generator is moved to a desired place. For this reason, a long electric cable does not need to be provided for supplying electric power to a remote place.

The wheels of the portable engine generator are guided by the wheel guide rails provided within the fixed soundproof housing. For this reason, it is easy to put the portable engine generator into or out from the fixed soundproof housing. If the portable engine generator, taken outdoors, is housed along the aforementioned rails and is completely housed in the fixed soundproof housing, then the exhaust air duct of the portable engine generator and the communicating duct of the fixed soundproof housing will be positioned and fixed at a position where they are communicated with each other in a state of close contact.

Because the suction duct for taking in outside air extends laterally at an inner part of the fixed soundproof housing remote from the door, the suction duct does not become an obstacle when the portable engine generator is put into or out from the fixed soundproof housing. The positioning member of the portable engine generator is provided in this suction duct. Therefore, when housing the portable engine generator, it can be positioned at the time the portable engine generator makes contact with the suction duct.

BRIEF DESCRIPTION OF THE DRAWINGS

Preferred embodiments of the present invention will be described in detail hereinbelow with reference to the accompanying drawings, in which.

DETAILED DESCRIPTION OF THE PREFERRED EMBODIMENTS

Figure 1:
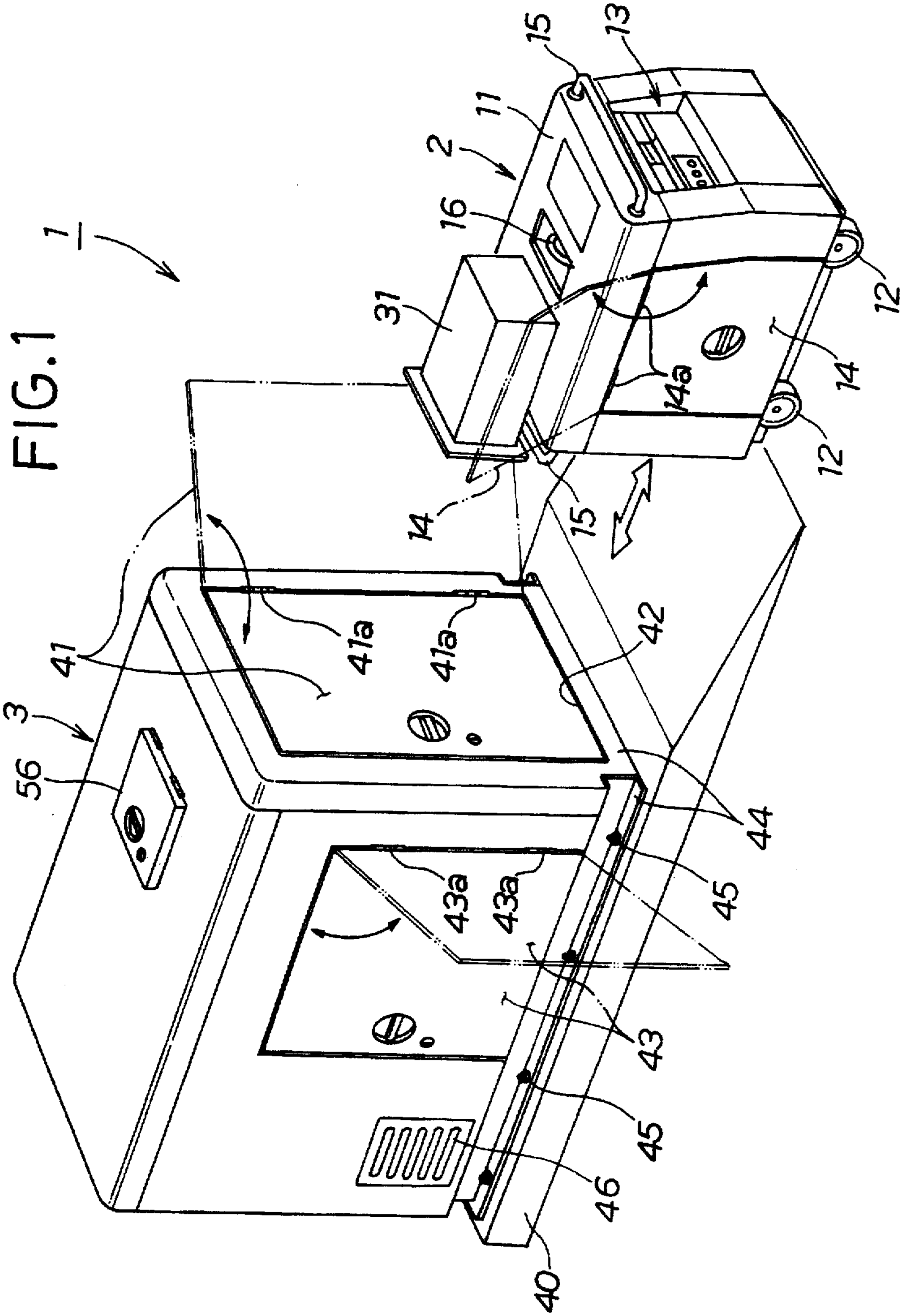
FIG. 1 is a perspective view showing the portable engine generator of a generator assembly according to the present invention, the portable engine generator being taken out from a fixed soundproof housing.

Referring to FIG. 1, a generator assembly 1 comprises a portable engine generator 2 and a fixed soundproof housing 3 for housing the portable engine generator 2 so that it can be put into and out from the housing 3.

The portable engine generator 2 includes a soundproof case 11 and an engine drive generator to be described later, housed in the soundproof case 11. The soundproof case 11 is formed into a rectangular box shape and is provided with four wheels 12, a rear console panel 13 (on the right in FIG. 1) having power switches and meters disposed thereon, and a side checking door 14. The checking door 14 can be opened in performing the maintenance and checking of the engine drive generator housed in the soundproof case 11, and the checking door 14 is supported by hinges 14*a* so that it can be opened upward only, as shown by a virtual line. Reference numerals 15 denote handles attached to the front and back of the soundproof case 11, and the handles are used in moving the portable engine generator 2. Reference numeral 16 denotes a hook for hanging the portable engine generator 2, which is attached to the top portion of the soundproof case 11.

The fixed soundproof housing 3 is a rectangular box installed outdoors and has an entrance door 41 at the rear, a secondary door 43 at the side and ventilating openings 46 (only one shown in FIG. 1) for taking in air from the left and right sides. The inner wall surface of the housing 3 is covered with soundproof materials.

The entrance door 41 is opened and closed in putting in and out the portable engine generator 2 and is a keyed door provided with hinges 41*a* so that it is opened to the outside, as shown by a virtual line.

The secondary door 43 is opened in opening and closing the checking door 14 of the portable engine generator 2 housed in the fixed soundproof housing 3 and is a keyed door provided with hinges 43*a* so that it is opened to the outside, as shown by a virtual line.

Reference numeral 44 denotes a lower frame of the fixed soundproof housing 3. The lower frame 44 is secured to a base 40 by means of a plurality of anchor bolts 45.

Figure 2:
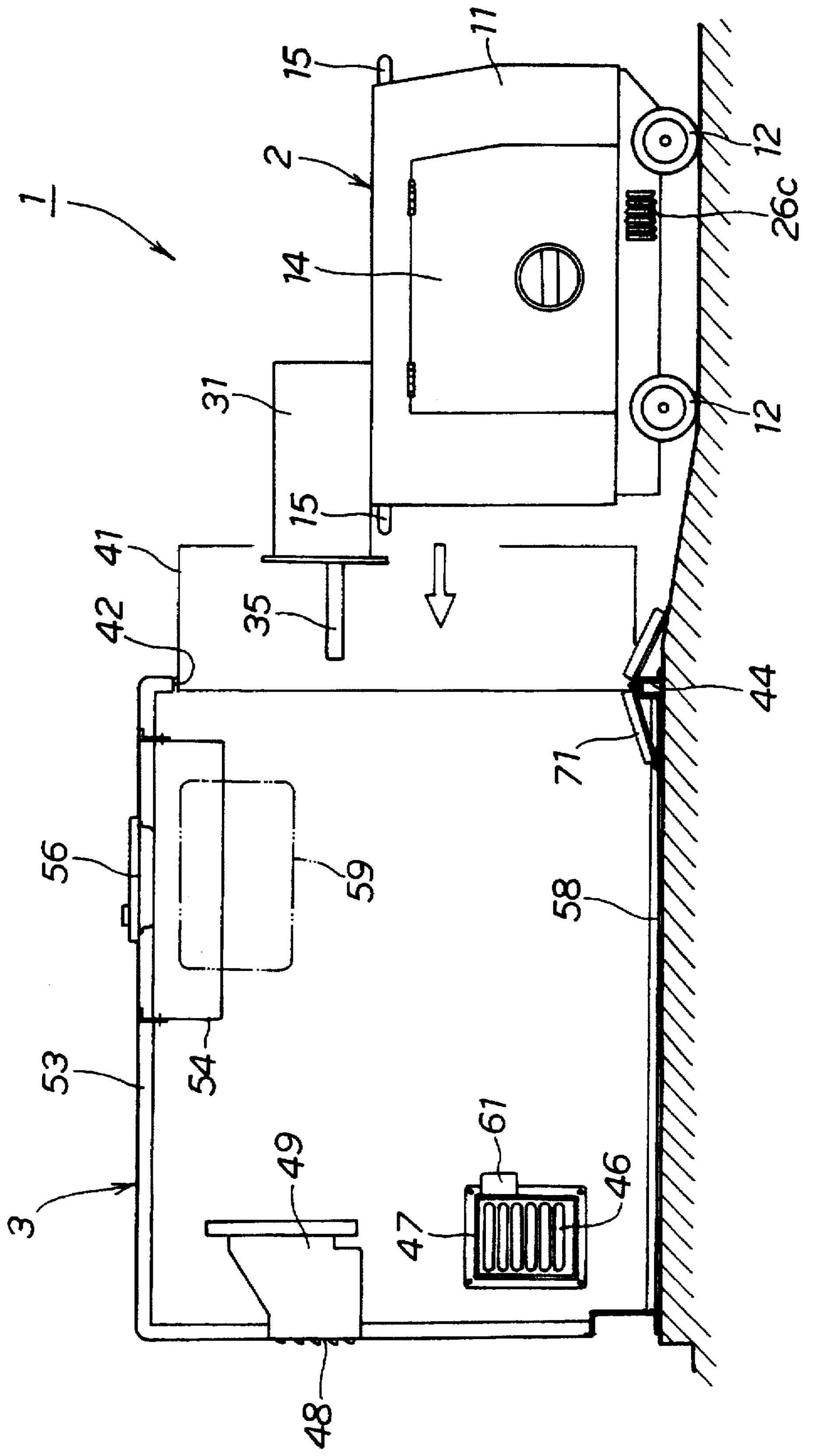
FIG. 2 is a diagram showing the side of the portable engine generator of the generator assembly according to the present invention and the section of the fixed soundproof housing, the portable engine generator being taken out from a fixed soundproof housing.

In FIG. 2, an exhaust air duct 31 provided on the top portion of the soundproof case 11 extends toward the front portion (left side in FIG. 2) of the portable engine generator 2.

The fixed soundproof housing 3 has a suction duct 47 extending in the lateral direction (front and back direction of FIG. 2) at the lower portion of the inner depth portion, and the aforementioned left and right ventilating openings 46 are provided on the opposite ends of the suction duct 47. The fixed soundproof housing 3 is further provided in an external exhaust opening 48 at the upper portion of the inner depth side (opposite to an entrance 42). The external exhaust opening 48 is connected to a communicating duct 49, which extends toward the entrance 42 opened and closed by the entrance door 41.

Figure 3:
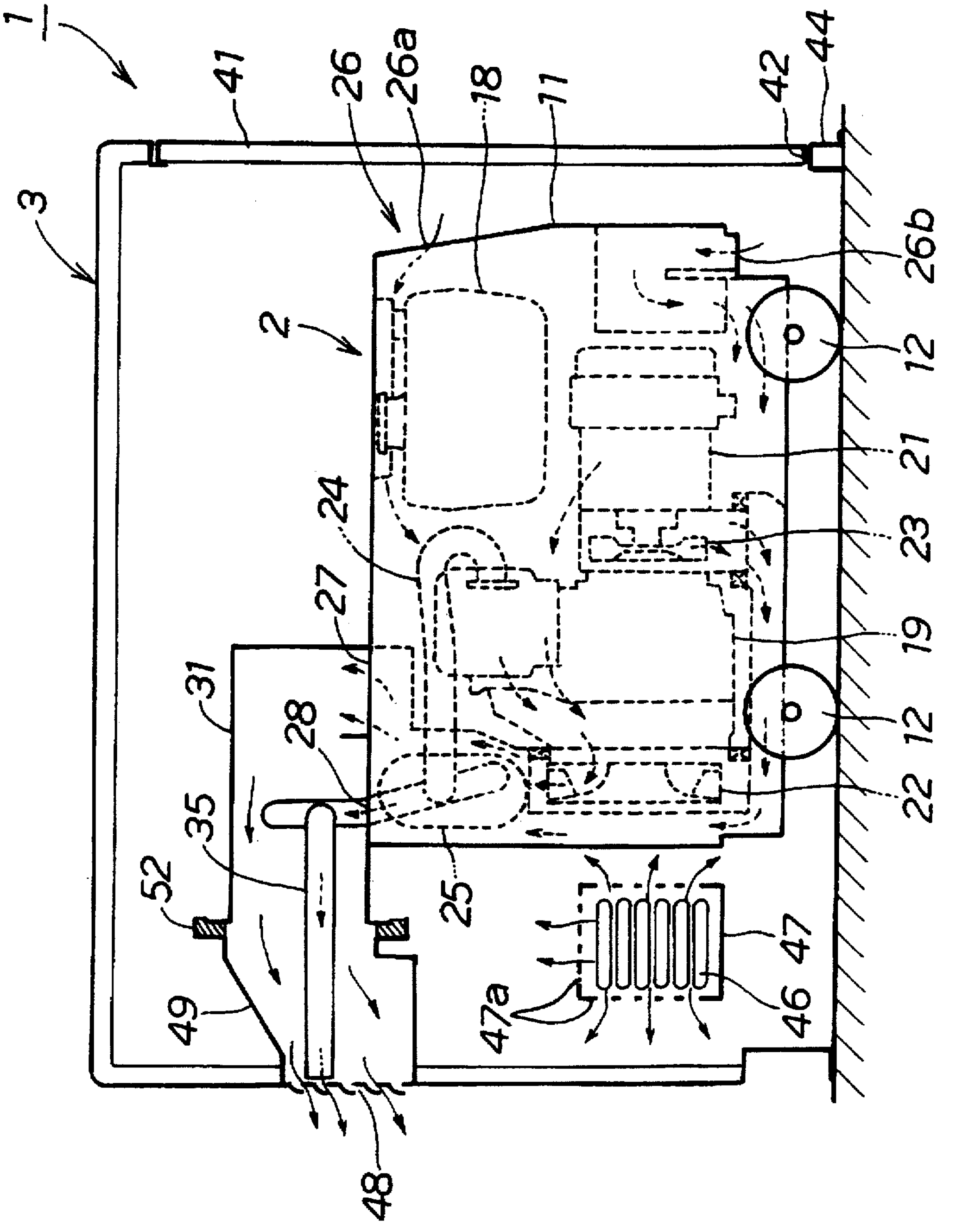
FIG. 3 is a schematic sectional view of the fixed soundproof housing of the generator assembly of the present invention where the portable engine generator has been housed.

FIG. 3 illustrates the state where the portable engine generator 2 has been housed in the fixed soundproof housing 3.

In FIG. 3, the soundproof case 11 of the portable engine generator 2 houses a fuel tank 18, an engine 19, an engine drive generator 21 driven by the engine 19, a cooling fan 22 for air cooling the engine 19, a generator cooling fan 23 for air cooling the engine drive generator 21, and a muffler 25 connected to an exhaust gas pipe 24 of the engine 19.

The soundproof case 11 is provided with a cooling ventilation hole 26 for taking outside air (cooling air) into the soundproof case 11, an exhaust air hole 27 for exhausting the cooling air from the soundproof case 11, and an exhaust gas hole 28 connected to the muffler 25 for exhausting the engine exhaust gas. The aforementioned cooling ventilation hole 26 consists of an upper ventilation hole 26*a*, a lower ventilation hole 26*b*, and a side ventilation hole 26*c* shown in FIG. 2.

The exhaust air hole 27 is connected to the exhaust air duct 31, which in turn is connected to the communicating duct 49. The exhaust gas hole 28 is connected to an extension exhaust gas pipe 35. The extension exhaust gas pipe 35 is inserted into the exhaust air duct 31 and is extended up to the vicinity of the external exhaust hole 48.

The suction duct 47 is in a shape where the cross section is rectangular, and a plurality of ventilation bores 47 a are formed in the top, front, and rear surfaces.

Figure 4:
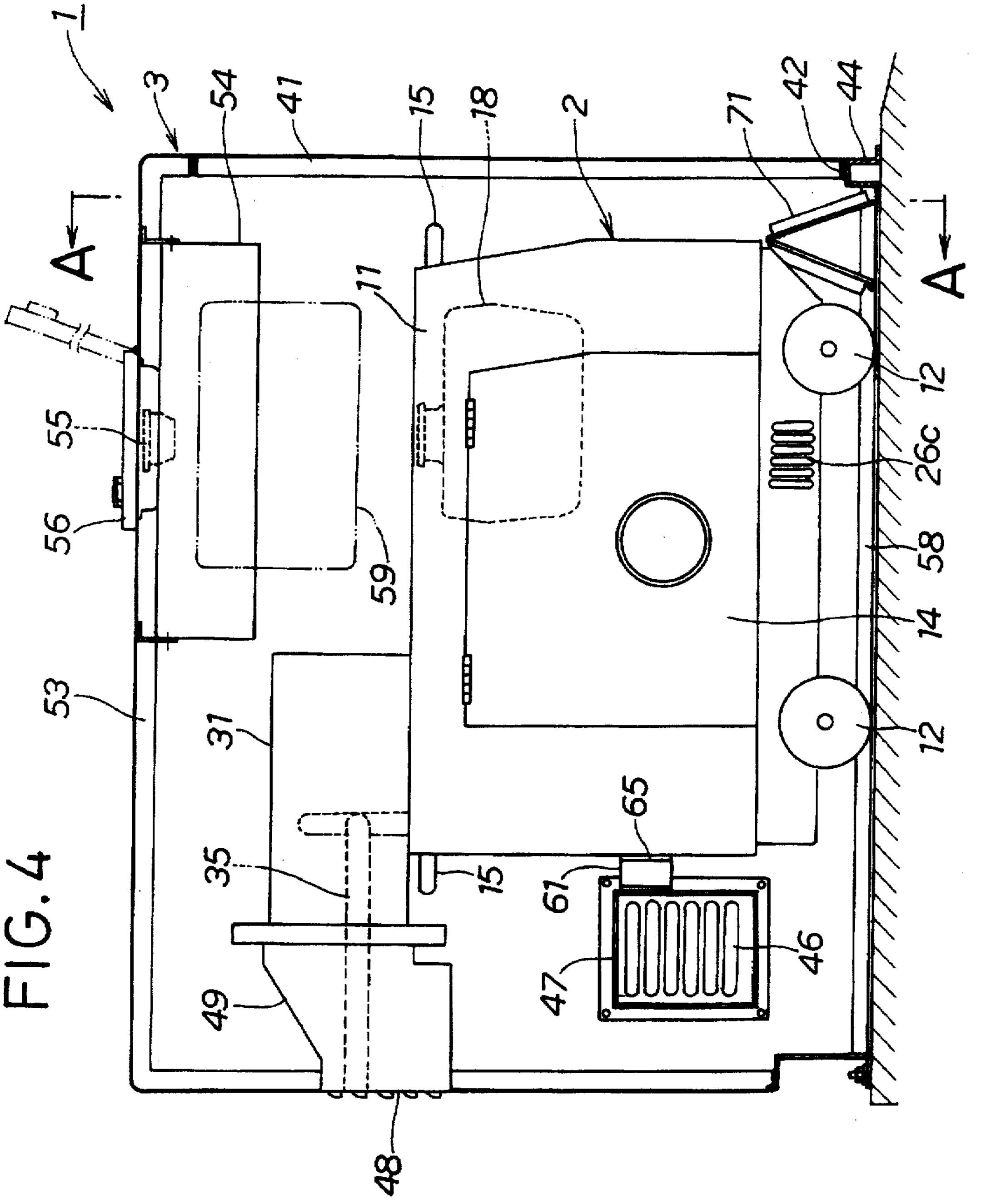
FIG. 4 is a schematic sectional view of the fixed soundproof housing of the generator assembly of the present invention where the portable engine generator has been housed.

FIG. 4 illustrates the state where the portable engine generator 2 has been housed in the fixed soundproof housing 3 and also positioned in a predetermined position. In this state, the exhaust air duct 31 and the communicating duct 49 are communicated in a state of close contact.

The main fuel tank 54 is hung on the ceiling 53 of the fixed soundproof housing 3, and in opposition to an oil supply lid 55 of this main fuel tank 54, a keyed lid 56 is attached to the ceiling 53. For this reason, in a case where oil is supplied to the main fuel tank 54, the keyed lid 56 is first opened and then the oil supply lid 55 is opened.

The main fuel tank 54 is connected to the fuel tank 18 of the soundproof case 11 through a change-over cock and a tube (not shown). The main fuel tank 54 has a larger capacity than the fuel tank 18. For this reason, with the portable engine generator 2 housed in the fixed soundproof housing 3, the portable engine generator 2 can be operated for a long period of time (24-hour consecutive operation is possible) by switching the change-over cock to the side of the main fuel tank 54.

In a case where the portable engine generator 2 is pulled out from the fixed soundproof housing 3 and used, the fuel joint (not shown) is removed and then the change-over cock is switched to the side of the fuel tank 18 to operate the generator 2 (8-hour consecutive operation is possible).

The fixed soundproof housing 3 is provided with a guiding plate 71 near the entrance 42.

Figure 5:
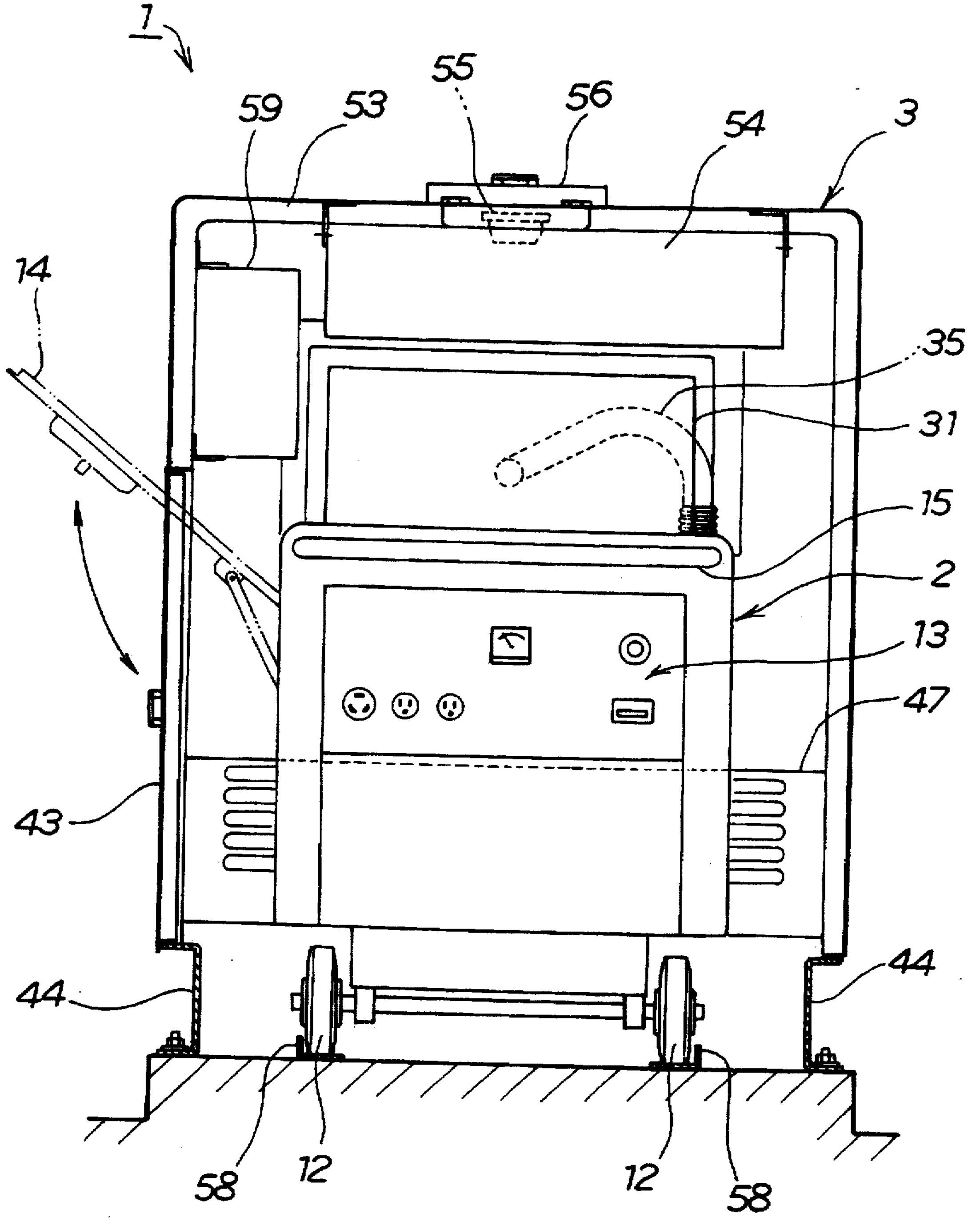
FIG. 5 is a sectional view taken substantially along line A—A in FIG. 4.

In FIG. 5, the guide plate 71 shown in FIG. 4 is omitted.

The fixed soundproof housing 3 is provided with a pair of wheel guide rails 58 for guiding a plurality of wheels 12 of the portable engine generator 2. These wheel guide rails 58 extend over the entire length of the fixed soundproof housing 3 so that the portable engine generator 2 can be prevented from being obliquely put into and out from the housing 3 when it is put into and out from the housing 3.

The checking door 14 can be opened up to a position shown by a virtual line and in this case the secondary door 43 is also opened.

With the portable engine generator 2 housed within the fixed soundproof housing 3, the generator 2 is connected to an electric cable buried in the ground, so the electric power generated by the portable engine generator 2 is transmitted to a desired electric installation such as a signal. In this case, the electric installation is connected to either an emergency power feed line from the portable engine generator 2 or a normal power feed line from a business power supply.

A wall type start control unit 59 is mounted on the inner wall portion of the fixed soundproof housing 3. The start control unit 59 controls the automatic starting and automatic stoppage of the portable engine generator 2 housed within the fixed soundproof housing 3 and also controls the switching of the normal power feed line and the emergency power feed line. For example, the start control unit 59 detects with the incorporated power stoppage detecting circuit that the normal power feed line is stopped, and automatically starts the engine 19 (see FIG. 3) by driving a self-motor with a battery power supply to perform power supply instead of the normal power feed line. The start control unit 59 also detects that the normal power feed line has been recovered (current conducting has been restarted) and then changes the change-over switch from the emergency power feed line (output line of the portable engine generator 2) to the normal power feed line to automatically stop the portable engine generator 2.

Figure 6A:
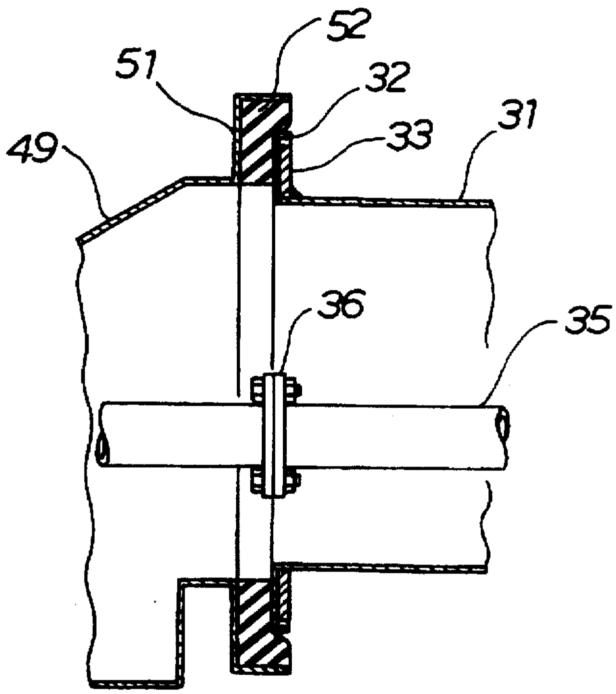
FIGS. 6A and 6B are sectional views of the communicated portion between an exhaust air duct and a communicating duct in accordance with the present invention.
Figure 6B:
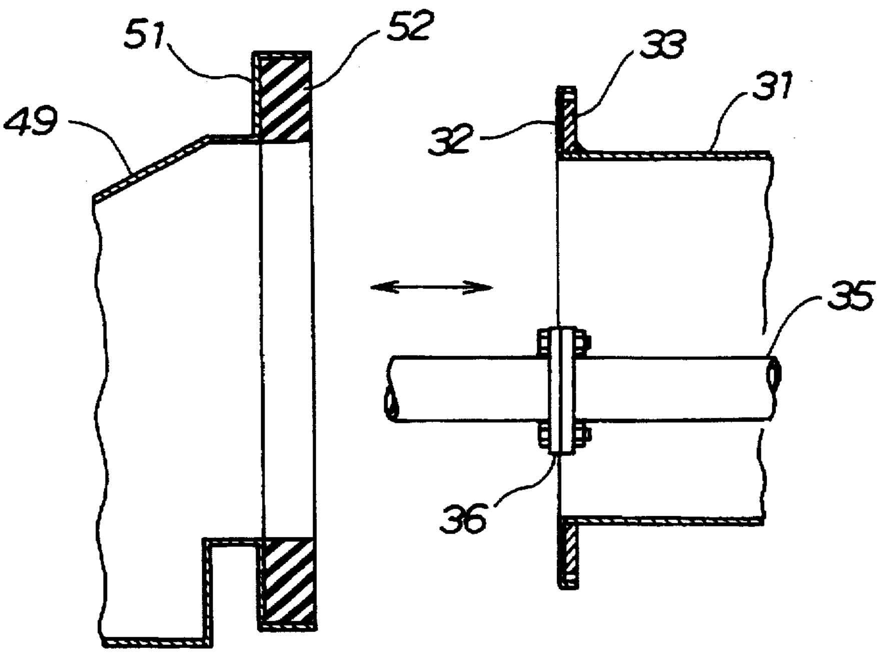

FIGS. 6A and 6B show the connected portion between the exhaust air duct 31 and the communicating duct 49. FIG. 6A shows the communicated state, while FIG. 6B shows the disconnected state.

The exhaust air duct 31 is provided with an exhaust flange 32 at the end thereof, and the communicating duct 49 is provided with a communicating flange 51 at the end thereof. The communicating flange 51 has a packing 52 attached thereto. As shown in FIG. 6A, the exhaust flange 32 is pressed against the packing 52. As a result, the exhaust air duct 31 is communicated with the communicating duct 49, and furthermore, air is prevented from leaking from the contacted surface between the exhaust flange 32 and the communicating flange 51. Reference numeral 33 denotes a stiffening plate attached to the back surface of the exhaust flange 31 to reinforce the flange 31.

The extension exhaust gas pipe 35, inserted into the exhaust air duct 31 and the communicating duct 49, is of the split type where the two parts are coupled by a coupling flange 36 at the position where the exhaust flange 32 and the communicating flange 51 are connected with each other.

With the portable engine generator 2 pulled out from the fixed soundproof housing 3, the extension exhaust gas pipe 35 extending from the exhaust air duct 31 will become short and look better, if the coupling flange 36 is separated from the pipe 35.

Figure 7A:
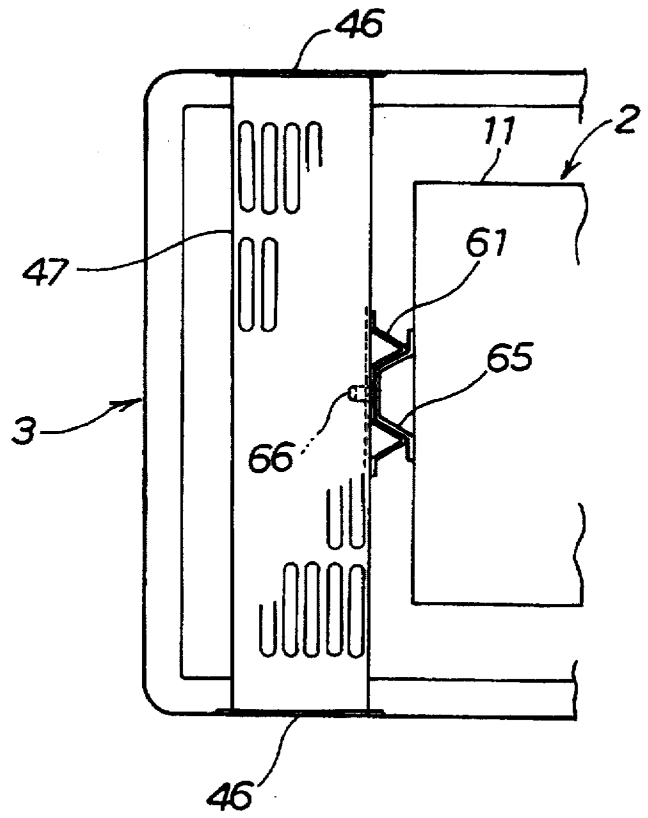
FIGS. 7A and 7B are schematic views showing the positioning member of the present invention.
Figure 7B:
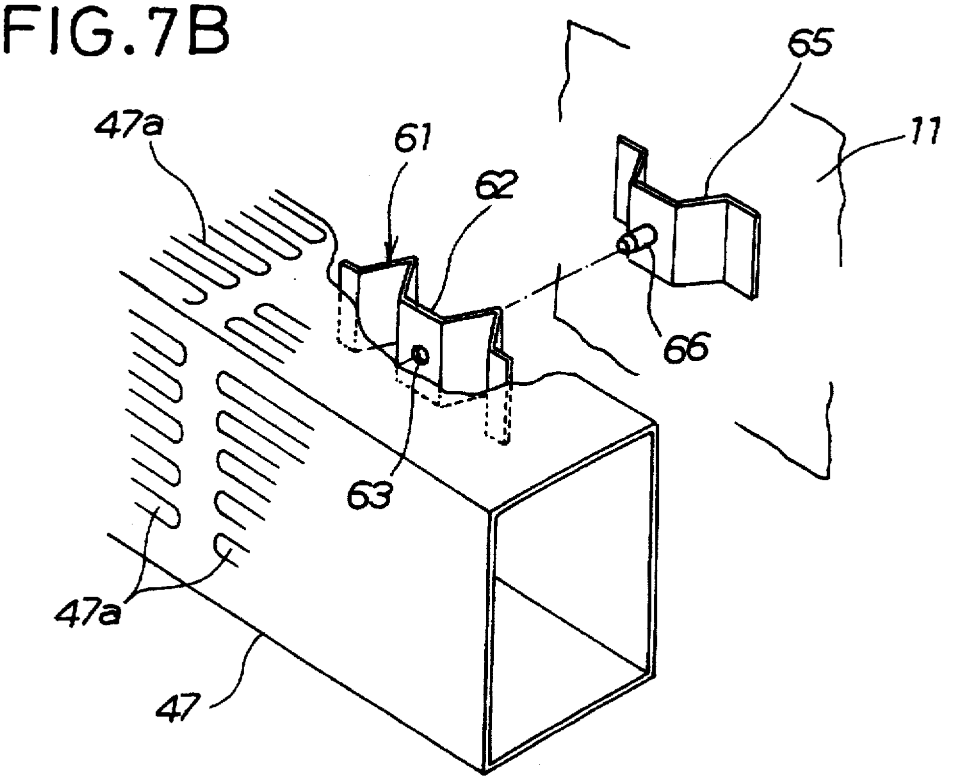

FIG. 7A shows the fixed soundproof housing 3 where the portable engine generator 2 has been positioned in a predetermined position and FIG. 7B shows the structure of the positioning member.

The suction duct 47, as shown in FIG. 7A, extends in the lateral direction in the inner part of the fixed soundproof housing 3 (in the vertical direction in FIG. 7A), and the positioning member 61 with a recess portion is attached to the side wall of the longitudinal central portion of the suction duct 47 by welding. A fitting protrusion member 65 is welded to the front portion of the soundproof case 11 so as to be opposed to the positioning member 61.

The positioning member 61, as shown in FIG. 7B, is formed into a generally M shape and a fitting hole 63 is bored in the female taper-shaped groove portion 62 of the positioning member 61. On the other hand, the fitting protrusion member 65 is formed into a male taper shape so that it can fit into the groove portion 62, and is provided with a fitting pin 66 which is fitted into the fitting hole 63. For this reason, with the engagement between the groove portion 62 and the fitting protrusion member 65 and the engagement between the fitting hole 63 and the fitting pin 66, the portable engine generator 2 is positioned longitudinally and laterally with respect to the fixed soundproof housing 3.

The positioning member 61 may be integrally formed with the suction duct 47. Also, the fitting protrusion member 65 may be integrally formed with the soundproof case 11. In a case where the positioning of the portable engine generator 2 can be performed with certainty by fitting the protrusion member 65 into the groove portion 62 of the positioning member 61, the fitting of the pin 66 into the fitting hole 63 is not always necessary.

Figure 8A:
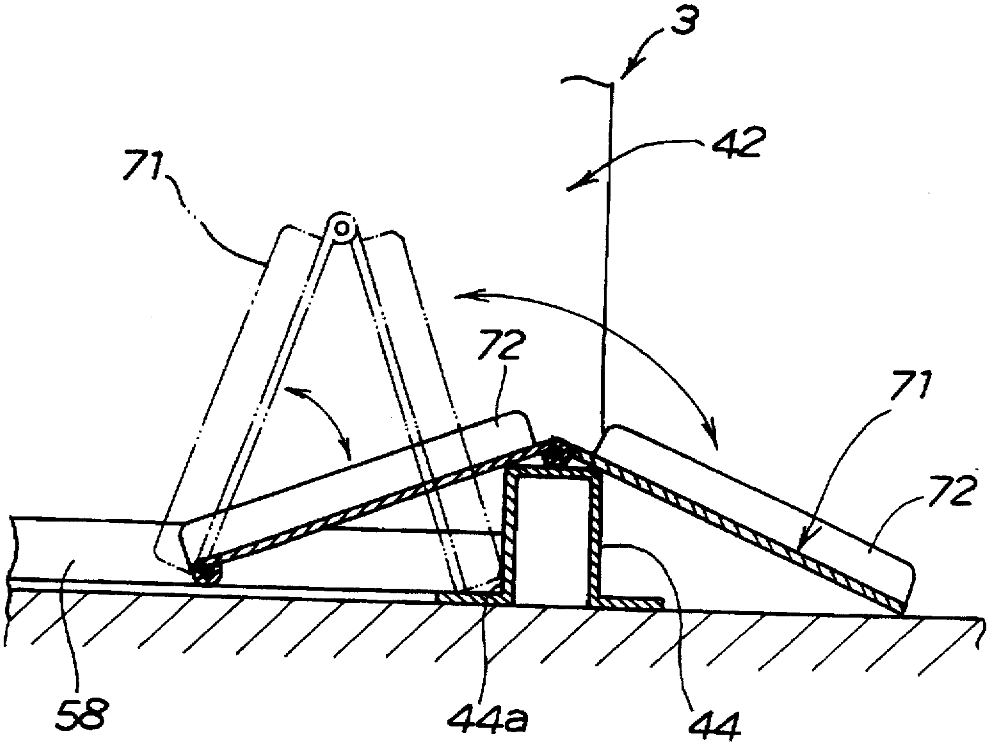
FIGS. 8A and 8B are schematic views of the guide plate of the present invention.
Figure 8B:
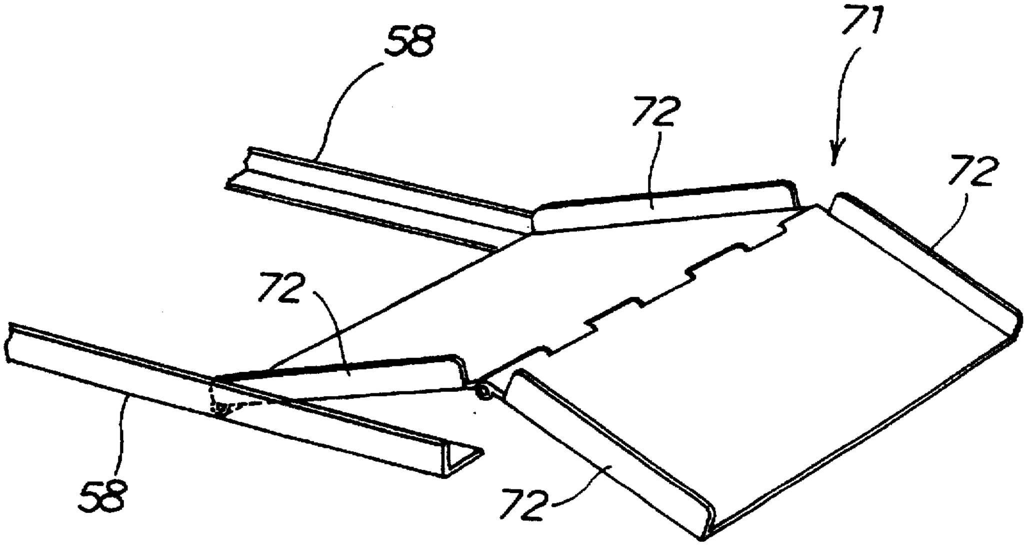
Figure 9:
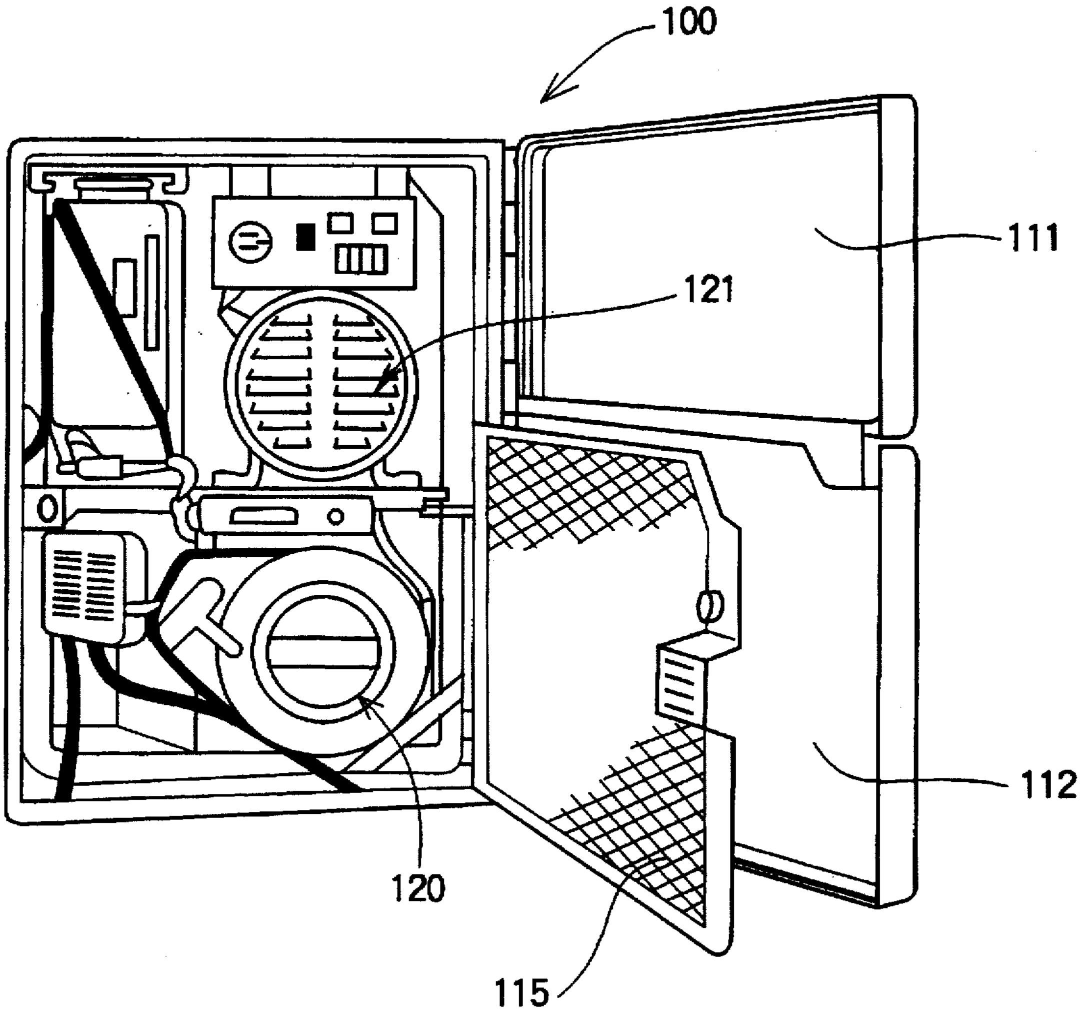
FIG.9 (PRIOR ART)
FIG. 9 is a schematic view showing a conventional engine working machine having an engine and a generator housed in a soundproof case.
Figure 10:
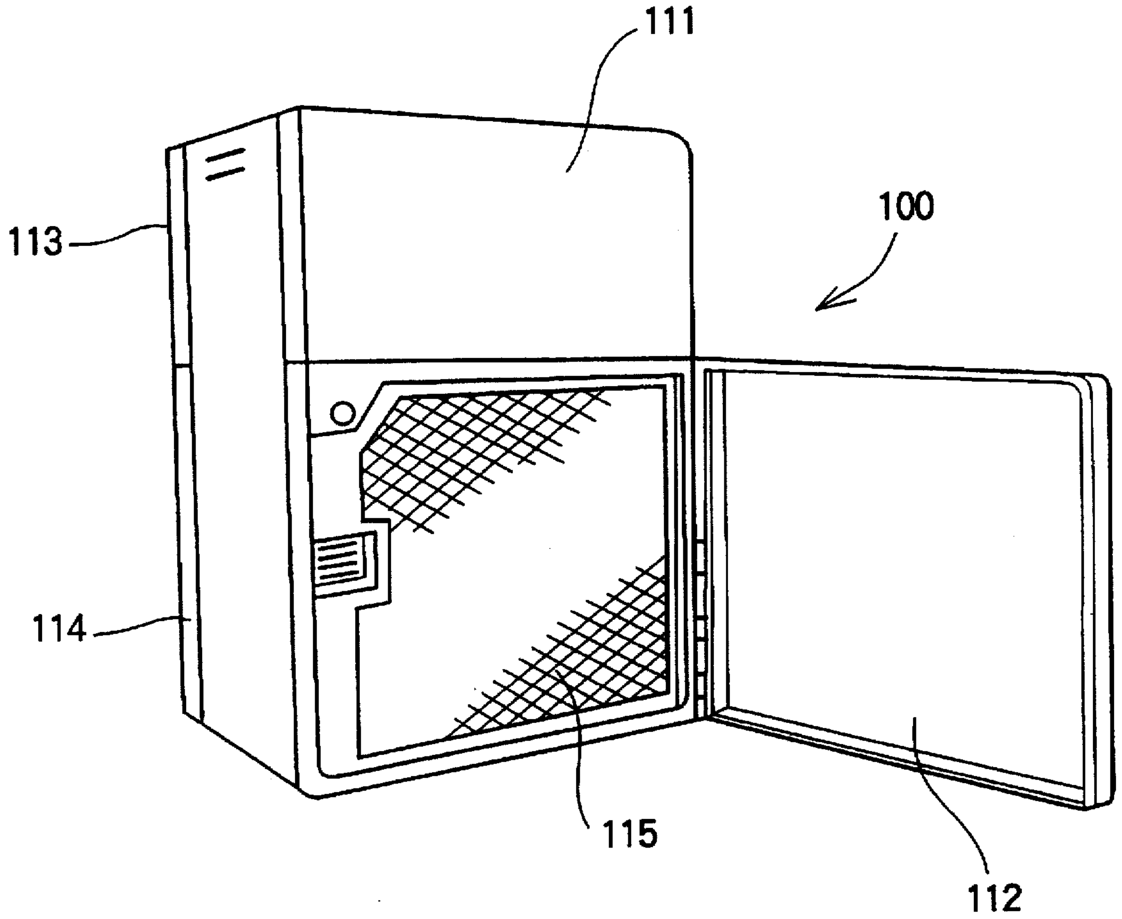
FIG. 10 (PRIOR ART)
FIG. 10 is a perspective view showing the conventional engine working machine, one door of the lower doors of the soundproof case in FIG. 9 being opened.
Figure 11:
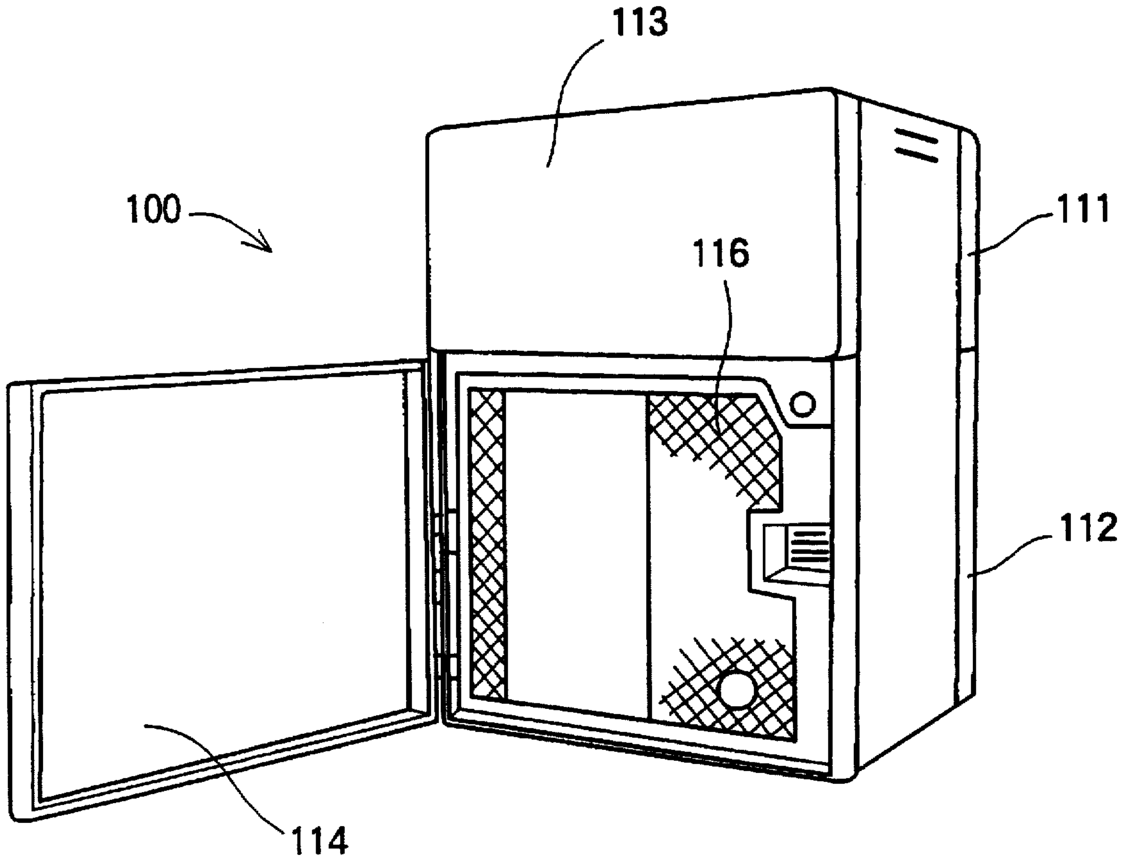
FIG. 11 (PRIOR ART)
FIG. 11 is a perspective view showing the conventional engine working machine, the other lower door of the soundproof case in FIG. 9 being opened.

The guide plate 71, shown in FIGS. 2 and 4, is shown in detail in FIGS. 8A and 8B. FIG. 8A is a sectional view of the guide plate 71 provided near the lower frame 44 of the fixed soundproof housing 3, while FIG. 8B is a perspective view of the guide plate 71.

The guide plate 71 is attached so that it can be folded near the lower frame 44 positioned under the entrance 42 of the fixed soundproof housing 3. The guide plate 71 is expanded across the lower frame 44 in putting the portable engine generator (see FIG. 2) into or out from the fixed soundproof housing 3. The guide plate 71 is hinged at the longitudinally central portion and is also pivotably connected to the wheel guide rails 58 at the lateral ends thereof. The guide plate 71 is further provided with parallel guide flange portions 72 at the sides thereof for guiding the left and right wheels 12 of the portable engine generator 2.

Thus, the guide plate 71, as shown by a solid line in FIG. 8A, is expanded across the lower frame 44 and guides the portable engine generator 2 when it is put into and out from the housing 3. Additionally, the guide plate 71, as shown by a phantom line in FIG. 8A, is folded so that the rear end thereof is pushed against the proximal portion 44a of the lower frame 44, and consequently, the guide plate 71 is prevented from falling toward the entrance 42 (right side in FIG. 8A). This folded structure of the guide plate 71 prevents the portable engine generator 2 from moving as shown in FIG. 4.

In this way, the guide plate 71 plays both a role of guiding a plurality of wheels 12 when putting the portable engine generator 2 in and out, as shown in FIG. 2, and also plays the role of a stopper for preventing the movement of the portable engine generator 2 housed within the fixed soundproof housing 3, as shown in FIG. 4.

Now, the procedure in which the portable engine generator 2 of the aforementioned structure is housed into the fixed soundproof housing 3 will be described based on FIGS. 2 and 4.

First, as shown in FIG. 2, the entrance door 41 is opened and the guide plate 71 is expanded across the lower frame 44.

Then, the front portion (left side in FIG. 2) of the portable engine generator 2 is pushed into the entrance 42. When this occurs, a plurality of wheels 12 are guided by the guide plate 71 and furthermore are guided into the fixed soundproof housing 3 by the wheel guide rails 58.

If the portable engine generator 2 is put up to the depth portion of the fixed soundproof housing 3, then the protrusion member 65 will be fitted into the positioning member 61, as shown in FIG. 4, and the portable engine generator 2 will be positioned in a predetermined position. At this point in time, the exhaust air duct 31 is automatically placed in close tight communication with the communicating duct 49, and also the extension exhaust gas pipe 35 is inserted into the communicating duct 49.

Thereafter, the guide plate 71 is folded and the rear end thereof is pushed against the lower frame 44. With this, the rearward movement of the portable engine generator 2 is prevented.

The main fuel tank 54 is connected to the fuel tank 18 by the fuel joint and then the change-over cock is switched from the fuel tank 18 to the main fuel tank 54. Thereafter, the portable engine generator 2 and the start control unit 59 are electrically connected with each other and the portable engine generator 2 is connected to the electric cable (not shown).

Finally, each switch of the portable engine generator 2 and the start control unit 59 is controlled so as to be set in a starting state. In this way, the housing operation is completed.

In a case where the portable engine generator 2 is pulled out from the fixed soundproof housing 3, the procedure opposite the aforementioned housing operation will be performed.

The portable engine generator 2, pulled out from the fixed soundproof housing 3, can be freely used at a desired place such as a work section and therefore has better mobility.

The flow of the cooling air and the exhaust gas within the fixed soundproof housing 3 will next be described based on FIG. 3.

The cooling air (outside air) taken from the suction hole 46 into the suction duct 47 flows into the fixed soundproof housing 3 through a plurality of ventilation holes 47a formed in the suction duct 47. Then, this cooling air flows from the cooling ventilation hole 26 (constituted by the upper ventilation hole 26a, the lower ventilation hole 26b, and the side ventilation hole 26c (see FIG. 4)) into the soundproof case 11 and is sucked by the engine cooling fan 22 and the generator cooling fan 23. After the cooling air cools the engine 19 and the engine drive generator 21, the cooling air flows through the exhaust air hole 27 and the exhaust air duct 31 to the communicating duct 49 and is exhausted outside from the external exhaust hole 48 as an exhaust gas. Therefore, there is no possibility that the exhaust cooling gas is confined within the fixed soundproof housing 3, and the engine drive generator 21 can be operated at any time if it is housed within the housing 3.

On the other hand, the engine exhaust gas flows through the exhaust gas pipe 24, the muffler 25, and the exhaust gas hole 28 to the extension exhaust gas pipe 35 and the communicating duct 49 is exhausted outside from the external exhaust hole 48. Therefore, as with the case of the cooling air, there is no possibility that the engine exhaust gas is confined within the fixed soundproof housing 3.

Thus, the portable engine generator 2 is provided with the exhaust air duct 31 and the extension exhaust gas pipe 35, and the fixed soundproof housing 3 is provided with the suction duct 47 and the communicating duct 49. Therefore, the engine 19 and the engine drive generator 21 are covered doubly by the soundproof case 11 and the fixed soundproof housing 3.

For this reason, the soundproof effect of the generator assembly 1 is further enhanced and still the durability is further enhanced with respect to changes in natural environments such as wind, rain, dust and sun.

Furthermore, the entrance door 41, the secondary door 43, and the lid 56, shown in FIG. 1, are provided with keys, respectively. Therefore, if they are locked up, they can be prevented from being robbed or from mischief and they will be most suitable in a case where automatic operation or remote operation is performed.

In the aforementioned embodiment, the portable engine generator 2 will be sufficient if it can be put into or out from the fixed soundproof housing 3, so a plurality of wheels 12 may be constituted only by two front and rear wheels.

As has been described above, the generator assembly according to the present invention is constructed such that the portable engine generator is provided with an exhaust air duct and that the fixed soundproof housing is provided with a suction hole, a communicating duct connected to an external exhaust hole. In addition, at the time the portable engine generator unit has been positioned by the positioning member, the exhaust air duct of the portable engine generator is communicated with the communicating duct of the fixed soundproof housing in a state of close contact. Therefore, if a portable generator unit is pushed into the fixed soundproof housing and fixed, then the portable generator unit can be set to a state where it can be operated at any time.

In addition, in the generator assembly of the present invention, the portable engine generator can be put into or out from the fixed soundproof housing. Therefore, in a case where electric power is supplied to a place away from the fixed soundproof housing, the portable engine generator can be moved to a desired place, a long electric cable does not need to be provided for supplying electric power to a remote place, and electric power can be supplied simply with high efficiency.

Furthermore, in the present invention, the portable engine generator is provided with wheels and the fixed soundproof housing is provided with wheel guide rails, so the portable engine generator can be easily put into and out from the fixed soundproof housing. Moreover, in the present invention, at the time the portable engine generator has been positioned by the positioning member, the exhaust air duct and the communicating duct are communicated with each other in a state of close contact, so the housing operation of the portable engine generator is simple.

Finally, in the present invention, the suction duct extends laterally at an inner part of the fixed soundproof housing remote from the door, the suction holes are provided in opposite ends of the suction duct, and the positioning member is formed on the side portion of the suction duct. Accordingly, the suction duct does not become an obstacle when the portable engine generator is put into or out from the fixed soundproof housing, and furthermore, when housing the portable engine generator, it can be positioned and fixed at the time the portable engine generator makes contact with the suction duct.

What is claimed is:

1. A generator assembly comprising:

a portable engine generator including an engine drive generator unit housed in a soundproof case having an exhaust air hole; and a fixed soundproof housing including a door for housing said portable engine generator in such a manner that it can be taken into and out from said housing, a suction hole for taking outside air in, and an external exhaust hole for exhausting cooling air exhausted from said exhaust air hole, wherein said portable engine generator further comprises wheels, said wheels enabling said portable engine generator to be rolled into and out of said fixed soundproof housing, and an exhaust air duct connected to said exhaust air hole, said fixed soundproof housing further comprises wheel guide rails for guiding said wheels, a positioning member for positioning said portable engine generator at a predetermined position within said fixed soundproof housing when said portable engine generator is rolled into and used within said fixed soundproof housing, and a communicating duct connected to said external exhaust hole, and when said portable engine generator is positioned at said predetermined position by said positioning member, said exhaust air duct of said portable engine generator is placed in close tight communication with said communicating duct of said fixed soundproof housing so that the cooling air is exhausted through said exhaust air hole of said soundproof housing to outside without leaking into said soundproof housing.

2. A generator assembly according to claim 1, wherein a suction duct extends laterally at an inner part of said fixed soundproof housing remote from said door, suction holes are provided in opposite ends of said suction duct, and said positioning member is formed on a side portion of said suction duct.

3. A generator assembly according to claim 2, wherein a protrusion member which is fitted into said positioning member is formed on a front portion of said soundproof case.

4. A generator assembly according to claim 1, wherein a guide plate is provided near a lower frame of said fixed soundproof housing so that it can be folded, said guide plate having both a function of guiding said portable engine generator when putting said portable engine generator into or out from said fixed soundproof housing and a function of preventing movement of said portable engine generator housed within said fixed soundproof housing.

* * * * *